United States Patent
Manfredotti et al.

[11] Patent Number: 6,021,580
[45] Date of Patent: Feb. 8, 2000

[54] INSTRUMENT FOR MEASURING THE CLEARANCE BETWEEN TWO COMPONENTS

[75] Inventors: Thomas Pierre Louis Manfredotti, Eguilles; Christophe Georges Barucchi, Vitrolles; Philippe Maurice Paul Antomarchi, Marseilles, all of France

[73] Assignee: Eurocopter, France

[21] Appl. No.: 08/986,194

[22] Filed: Dec. 5, 1997

[30] Foreign Application Priority Data

Dec. 6, 1996 [FR] France ................................. 96 15022

[51] Int. Cl.⁷ ........................................................ A45B 3/08
[52] U.S. Cl. ................ 33/712; 33/783; 33/815; 33/549; 33/555
[58] Field of Search ............................. 33/712, 783, 813, 33/815, 549, 555, 600, 605, 532

[56] References Cited

U.S. PATENT DOCUMENTS

| | | | |
|---|---|---|---|
| 643,080 | 2/1900 | Boulet | 33/532 |
| 1,389,381 | 8/1921 | Renton | 33/532 |
| 1,511,624 | 10/1924 | McGuckin | 33/712 |
| 1,643,570 | 9/1927 | Bartholdy | 33/532 |
| 2,185,843 | 1/1940 | Fraser | 33/712 |
| 2,731,825 | 1/1956 | Le Van | 33/532 |
| 3,327,399 | 6/1967 | Gershman | 33/532 |
| 3,769,712 | 11/1973 | Hong | 33/813 |

FOREIGN PATENT DOCUMENTS

| | | |
|---|---|---|
| 1 103 802 | 3/1984 | European Pat. Off. . |
| 0 106 244 | 4/1984 | European Pat. Off. . |
| 01 257 235 | 10/1989 | Japan . |
| 1 439 755 | 6/1976 | United Kingdom . |

*Primary Examiner*—Randy W. Gibson
*Attorney, Agent, or Firm*—Henderson & Sturm LLP

[57] ABSTRACT

The instrument comprises two rigid yokes 1 and 2 capable of sliding one with respect to the other in the direction of the clearances to be measured between two components (R, 5) and 8. First of all, using an operating member 3, enough force to bring the ball R against the stop b1 of its socket is exerted on the component 5 by means of a spring 10. The comparator 9 is zeroed. Enough force is then exerted on the component 5 to bring the ball R to rest on the opposite stop b2 of its socket, this being done using an operating member 4 that acts in the opposite sense, the clevis mount 8 still being held between two resting faces 6, 7 of the yokes 1, 2. The clearance of the ball R in its socket is then read directly off the comparator 9. Application to measuring clearances in ball joints.

20 Claims, 5 Drawing Sheets

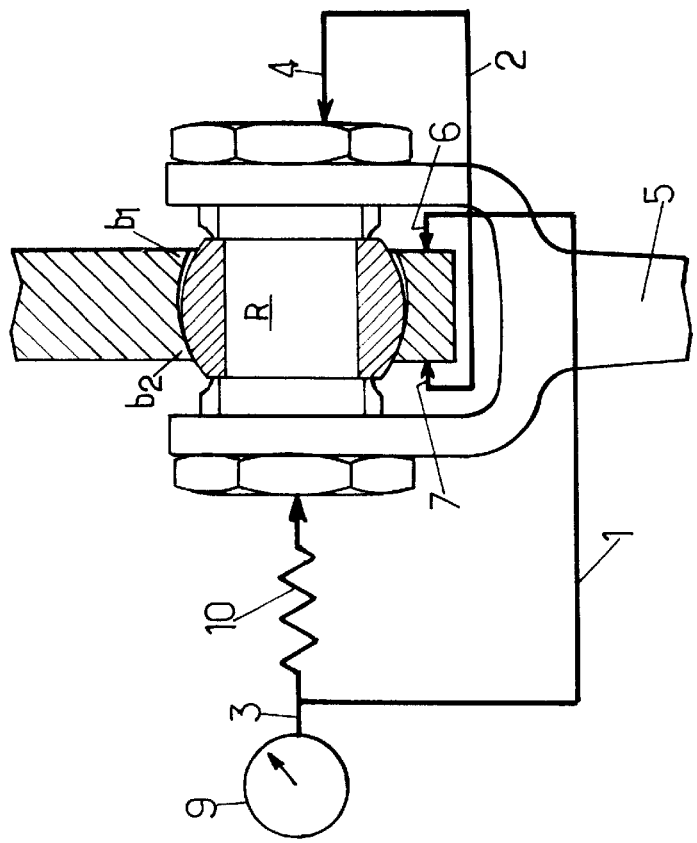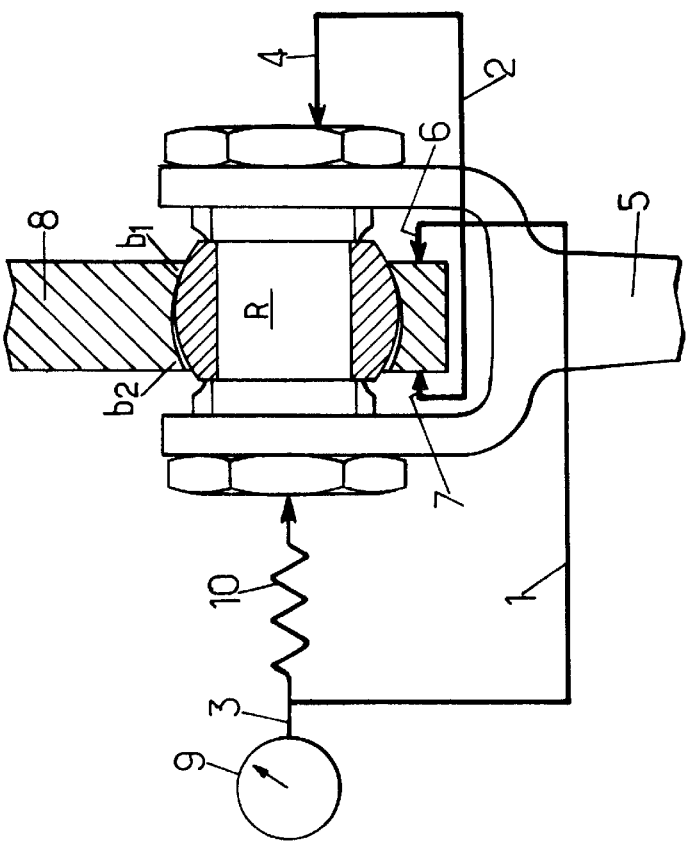

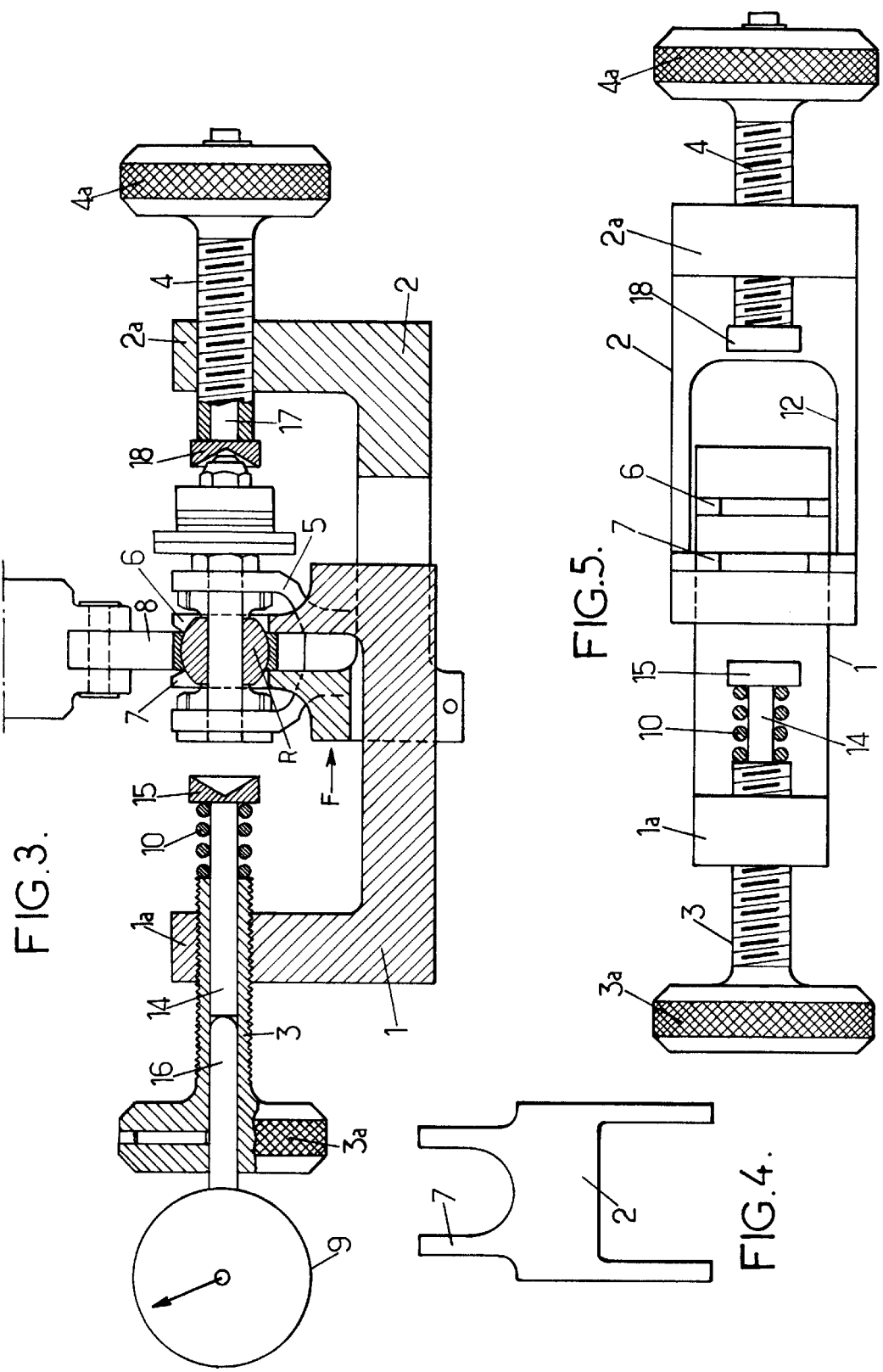

INSTRUMENT FOR MEASURING THE CLEARANCE BETWEEN TWO COMPONENTS

The present invention relates to an instrument for measuring a clearance, in a given direction, between two components.

This may, for example, be measuring the clearance in a ball joint that forms part of a motion-transmission line in a helicopter, for example at the tail rotor. In these craft and for obvious safety reasons, these clearances need to be checked regularly, as the cyclic stresses applied to the ball joints are at a high frequency. Many other components may find themselves in this situation. Usually, the components involved are removed so that the clearances can be measured on a table with a comparator, which involves significant amounts of labour time for removal, measurement and refitting, with also a risk of incorrect handling and errors or inaccuracies in the measurements, because the clearances are then being measured on dismantled components which are no longer in the normal situation in which they operate.

The object of the present invention is to avoid these drawbacks by using an instrument that can be mounted and adjusted on the components to be measured so that it is not necessary (although it is possible) to dismantle these components in order to measure their clearance; the clearances can be measured quickly in situ without any dismantling, rather than at the laboratory.

For this purpose, a measuring instrument in accordance with the invention is characterized in that it comprises two rigid yokes that can slide one inside the other in the said direction and each of which comprises on the one hand, a push member capable of exerting axial thrust, in a given sense, on one—termed the first—of the said components, at least one of these members exerting its thrust by means of a spring, and on the other hand a member for resting on the other component, capable of exerting an end-stop action on this other component in the opposite sense to the sense in which the said push member of the yoke in question exerts its force, the said push members of the two yokes being capable of exerting their forces coaxially but in two opposite senses, and in that at least one of the said push members is associated with measurement means of the comparator kind for measuring, in the said given direction, the difference between the two axial positions of the said first component, namely the end-stop position it reaches when it is urged axially by the push member of one of the yokes and the end-stop position it reaches when it is urged axially in the other sense by the push member of the other yoke, while the said other component remains trapped between the respective resting members of the two yokes.

According to another embodiment of the invention, the instrument may also be characterized in that the push member, which has a spring, of one of the said yokes is produced in the form of a threaded shank ending in an operating member by which it can be turned in a tapping of the yoke in question, this threaded shank having an axial bore passing through it in which there may slide, on the one hand, a smooth rod which externally ends in a stop that can rest on the first of the said components and, on the other hand, the plunger of a comparator, it being possible for the end of this plunger to come into contact with the interior end of the said smooth rod, it being possible for a helical spring slipped over the said smooth rod to be compressed between the said stop and that end of the said threaded shank that does not have the said operating member.

The instrument may also be characterized in that the said rigid yokes are generally U-shaped, the closed end of one being hollowed out so that the closed end of the other yoke can slide in it, and in that the push member associated with the yoke that has the hollowed-out closed end is produced in the form of a threaded shank ending in another operating member by which it can be turned in a tapping of the yoke in question, this threaded shank having an axial bore passing through it in which another smooth rod, immobilized axially in this bore and able to pivot therein, can pivot, the said smooth rod ending, at the end that does not have the said other operating member, in another stop which can rest on the first of the said components.

In this case, it will be advantageous for the said tappings for the threaded shanks to be formed in the two outer branches of the said yokes, the inner branches of which end in the form of a fork leaving space for the first of the said components and capable of trapping the other component between them.

According to another embodiment, the instrument may be characterized in that the said other yoke has a branch that directly carries another stop that can rest on the first of the said components, a base for a member for resting on the other component, and a threaded shank engaged in a tapped hole in the said base for manoeuvring the said branch, this threaded shank having another operating member on the same side as the operating member of the push member which has a spring.

The invention also relates to an instrument produced along the lines of those which have just been defined and which additionally has the advantage of allowing the clearances of ball joints in which the axis is not parallel to the axis of the clevis mounts to be measured.

This instrument may also allow the force supplied to the component in question (ball or the like) to be calibrated, and this will make the measurements more repeatable.

To achieve these objectives, an instrument in accordance with the invention may further be characterized by the following arrangements:

the tappings for the threaded shanks are formed in nuts which can slide, transversely to the axis of these tappings, over respective cylindrical bearing surfaces formed on the internal faces of the branches of the corresponding yokes, the said branches having a slot through them for the said threaded shanks, these thus being able to pivot, while remaining aligned, in a determined angular range about a common centre of curvature of the said cylindrical bearing surfaces;

provision is also made, independently of or in combination with the previous arrangement, that the push members are each associated with means for controlling the force applied by them to the said first component, these control means preferably comprising a spring which can be compressed between the closed end of an end-stop sleeve and the end of the corresponding push member over which end the said sleeve is engaged, the said push member bearing a mark near the end of the sleeve so that as this end is reached, the compressive force of the corresponding spring will be known.

Other features of the invention will be seen later; its general principle can already be understood from examining the diagrammatic drawing of FIGS. 1 and 2 appended hereto which, in succession, depict the two phases in measuring the axial clearance between two components;

FIG. 3 is a view in axial section of a first embodiment of the instrument, when applied to measuring a clearance on a helicopter transmission ball joint;

FIG. 4 is an end-on view of one of the yokes in the direction of the arrow F of FIG. 3;

FIG. 5 is a view from above of the instrument of FIG. 3;

Figure 6:
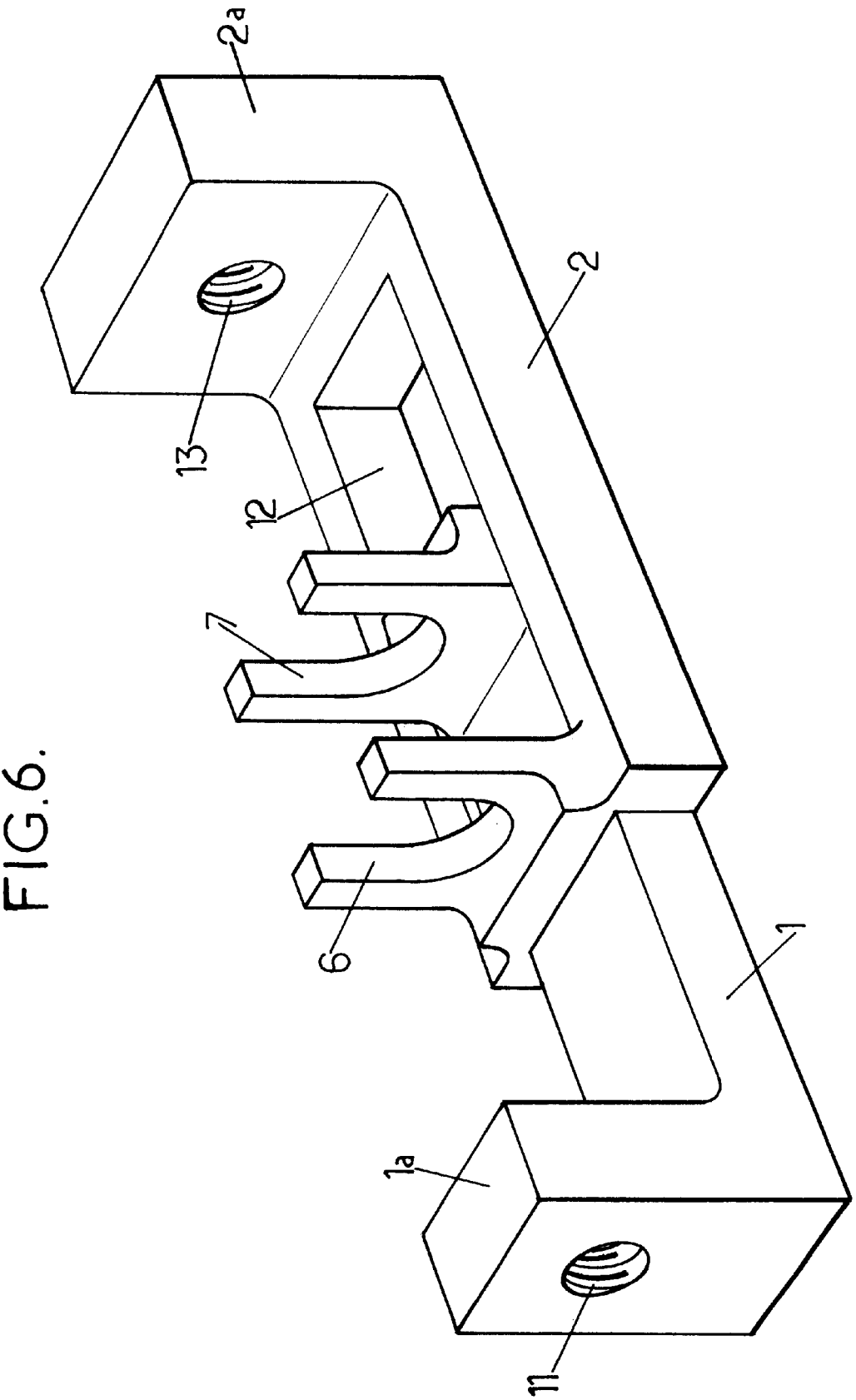
FIG. 6 is a perspective view of the two bare yokes, after they have been nested together.

In FIGS. 1 and 2, the instrument has been depicted entirely diagrammatically, in the instance where the radial clearance of a ball R carried by a clevis mount 5 relative to its socket, carried by another clevis mount 8 is to be measured. What is therefore to be determined is the clearance between this ball R and its socket in the direction of the axis of the ball, this clearance being between the extreme position of FIG. 1 and the opposite extreme position of FIG. 2.

To do this, and as indicated in the foregoing, use is made of a measurement instrument that comprises two extremely rigid yokes 1 and 2 which can fit one inside the other, as can be seen with reference to the other figures.

The yoke 1 has a push member 3 associated with measurement means 9 and capable, by means of a spring 10, of exerting axial thrust (to the right) on the clevis mount 5; this same yoke 1 also has a member 6 for resting on the clevis mount 8, capable of exerting a reaction force in the opposite sense (to the left).

Conversely, the yoke 2 has a push member 4 capable of exerting, directly, an axial thrust (to the left) on the clevis mount 5, and a member 7 for resting on the clevis mount 8, capable of exerting a reaction force in the opposite sense (to the right).

The clearance can therefore be measured in two stages: first of all the push member 3 (for example a screw) is operated to push the clevis mount 5 to the right until the ball R comes to rest against the stop b1 of the clevis mount 8, compressing the spring 10, the clevis mount 8 being held axially by the resting member 6 of the yoke 1. The instrument 9 is then zeroed (FIG. 1).

Next, the push member 4 is operated to push the clevis mount 5 to the left until the ball R comes to rest against the stop b2 of the clevis mount 8, which is still held axially immobile by the resting member 7 of the yoke 2 (FIG. 2). During this operation, the return spring 10 of the push member 3 allows this member to move back by the clearance to be measured, and this allows this clearance to be read immediately off the measuring member 9.

The same principle is employed in the embodiments of the subsequent figures, in which the same references have been used to denote the same members or similar members or members that have the same function as the earlier ones.

With reference to the embodiment of FIGS. 3 to 6, it can be seen that the two rigid yokes 1 and 2 are generally U-shaped; the branch 1a of the yoke 1, which is solid, has a tapped hole 11 passing through it, and its other branch ends in a resting member in the form of a fork 6. The yoke 2 has a cavity 12 in which the yoke 1 can slide, and its branch 2a has a tapped hole 13 passing through it; its other branch ends in a resting member in the form of a fork 6, which is, in theory, similar to the fork 6 and perfectly aligned with it. These forks may be covered with anti-shock paint so that they do not damage the components being measured.

Screwed into the tapped hole 11 in the yoke 1 is a push member 3 in the form of a threaded shank ending in a knurled knob 3a. The shank 3 has an axial bore passing through it in which a rod 14 can slide, there being a stop 15, for example made of a synthetic material unlikely to damage the components to be tested by contact with them, fixed to the exterior end of the rod 14. Mounted between the stop 15 and the end of the shank 3 is a helical spring 10. The plunger 16 of a comparator 9 may be engaged in the bore of the shank 3 so that it can butt against the end of the rod 14.

Screwed into the tapped hole 13 of the branch 2a of the yoke 2 is another push member 4 in the form of a threaded shank ending in a knurled knob 4a. The shank 4 has an axial bore passing through it in which a rod 17, which ends in a stop 18 similar to the stop 15, can turn, while being axially immobilized.

The ball joint assembly whose clearance is to be measured is then positioned on the instrument so that the clevis mount 8 of the ball R can be trapped between the forks 6 and 7. The knurled knob 3a is then turned until the stop 15 is brought against the left-hand branch of the clevis mount 5, the spring 10 then being compressed to ensure that the ball R rests against the right-hand stop of its socket, all of the clearance then being on the left-hand side. The comparator 9 is zeroed, then the knurled knob 4a is turned so as to push the clevis mount 5 back to the left and bring the ball R to rest against the left-hand stop of its socket, something of which the operator becomes aware because of the increase in resistance. All of the clearance is now on the right-hand side. The comparator therefore gives a direct reading of the clearance between the ball and its socket. The ball joint has not been dismantled in any way, and it has been possible for all of the measurement operations to be carried out very quickly.

Note that load limiters can be installed on the knobs so as to prevent the ball joints from being damaged by excessive loading.

Figure 7:
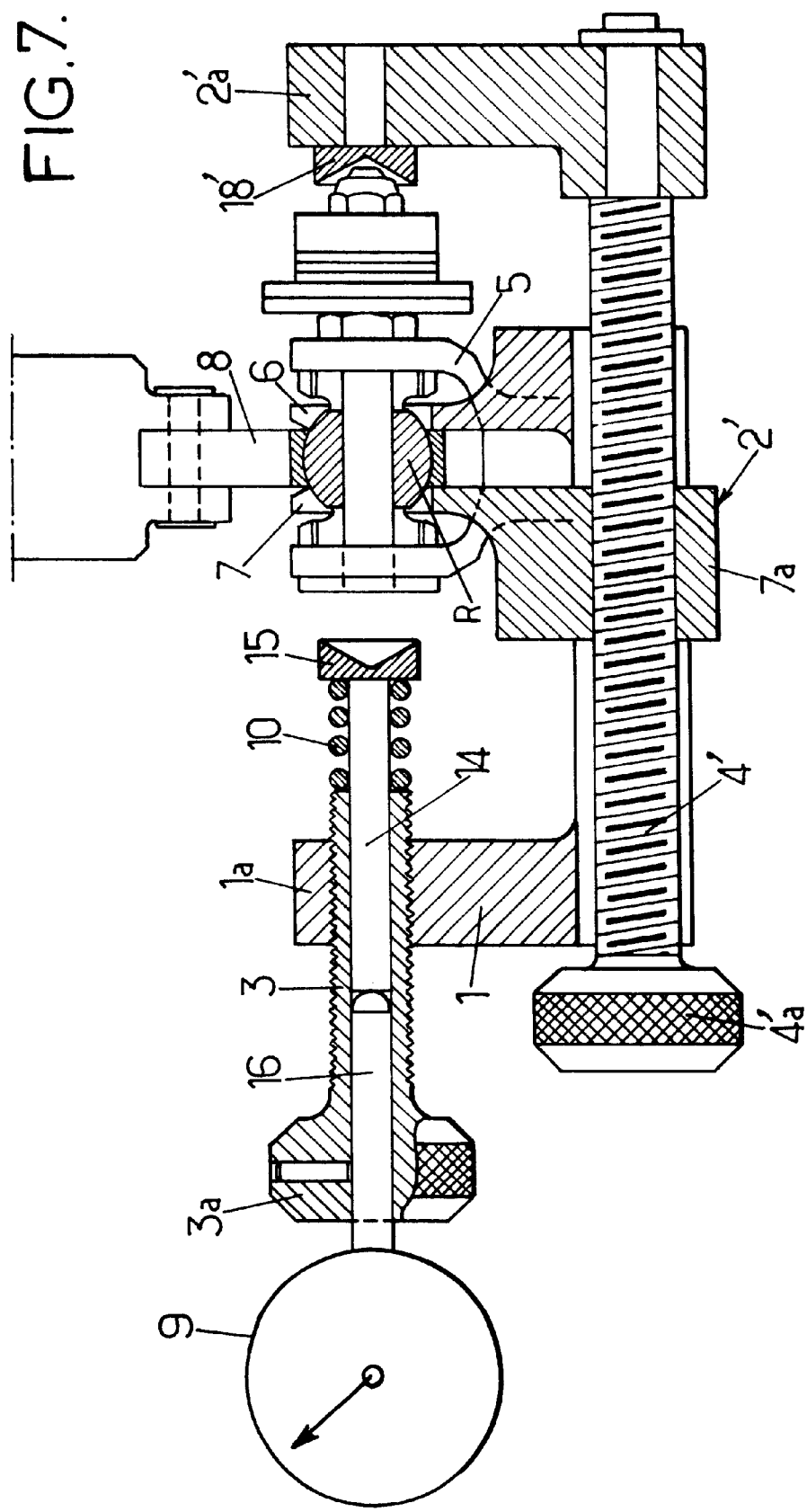
FIG. 7 is a view in axial section of the instrument, according to an alternative form.

If the ball joint is only accessible from one side, use can be made of the instrument of FIG. 7, which works in the same way as the one which has just been described, and whose structure only will therefore be described.

In the instrument of FIG. 7 use has again been made of the same references as above to denote the same members or equivalent members (with the prime symbol added as appropriate).

The stop 18' is then borne directly by the branch 2'a of the yoke 2', which can move with respect to the fork 7 with which it is associated. The axial displacement between these two components is brought about by a screw 4' ending in a knurled knob 4'a which is on the same side as the knurled knob 3a, this screw being engaged in a tapped hole in the base 7a of the fork 7. This base, the branch 2'a and the screw 4' together form the yoke 2'.

The operation is the same as before except that the knurled knobs 3a and 4'a can be accessed from one and the same side of the instrument, operating the knurled knob 4'a allowing the stop 18' to press against the corresponding end of the ball.

Figure 8:
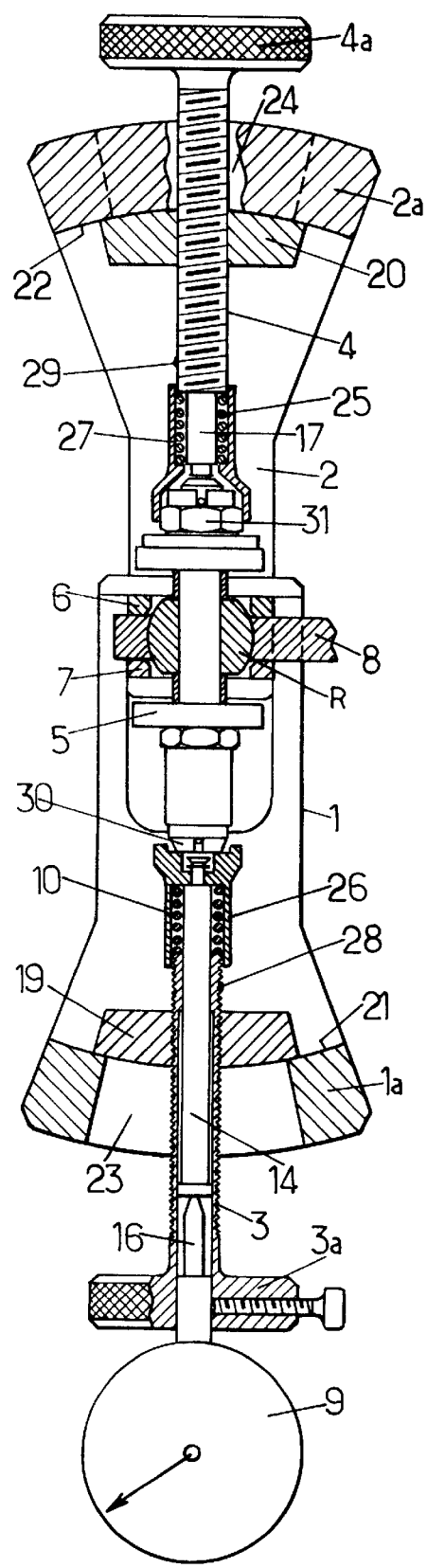
FIG. 8 depicts, in axial part section, another instrument in accordance with the invention in position for measuring clearances on a ball joint the axis of which is parallel to the axis of the clevis mounts.
Figure 9:
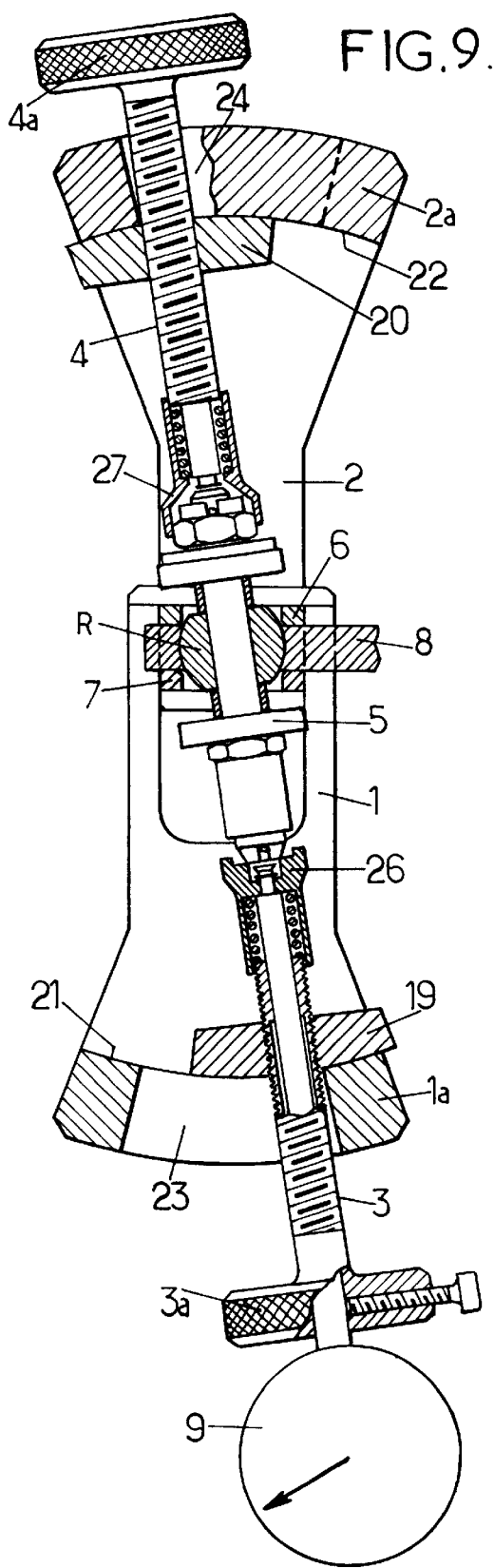
FIG. 9 similarly depicts this instrument in position for measuring clearances on a ball joint in which the axis is not parallel to the axis of the clevis mounts.

The instrument depicted in FIGS. 8 and 9 essentially comprises the same members and the same arrangement as the one in FIGS. 3 to 6 and for this reason the parts which are common, similar, or have the same function will be denoted by the same references.

This instrument can be distinguished from the previous one first of all by the fact that the threaded shanks 3 and 4 of the push members are not screwed into the respective outer branches 1a and 2a of the yokes 1 and 2 but into nuts 19 and 20 respectively which can rest on and slide along the concave cylindrical internal faces 21 and 22 of these branches, these nuts therefore having a complimentary convex cylindrical face. The threaded shanks 3 and 4 also pass through curved slots 23 and 24 respectively in the branches 1a and 2a; it can be seen that in this way the aligned shanks 3 and 4 can be pivoted about the common centre of curvature of the cylindrical bearing surfaces 21 and 22, and that this can be achieved over the angular range allowed by the length of the curved slots 23 and 24 (see FIG. 9). This will make it possible to measure the clearances of the ball (or some other component) with inclined axes in one sense or the other with respect to that of the clevis mount 8 (amplitude of the order of 10° for example).

This instrument can also be distinguished from the previous one by the fact that it has means for controlling the force supplied by the push members 3 and 4 (when the knurled knobs 3a and 4a are turned) on the component 5 and therefore on the ball R as it comes into abutment at one or other of the ends of its socket in the clevis mount 8. These means comprise, in the case of each pushing member, a spring 10 and 25 respectively, which can be compressed between the closed end of an end-stop sleeve 26 and 27 respectively, and the end of the corresponding pushing member 3, 4. Each sleeve is designed to act as an end stop against the clevis mount 5 (here by means of nuts such as 30 and 31 capped by the sleeves), and its end is engaged, and can therefore slide, over the end of this pushing member. Furthermore, a mark, 28, 29 respectively, for example a paint mark, is provided on each pushing member 3, 4 some distance from the end of the corresponding sleeve. This distance is chosen to be such that this mark begins to disappear under the sleeve when the end of the pushing member has compressed the corresponding spring 10, 25 with a predetermined load, for example 10 daN for the spring 10 and 20 daN for the spring 25.

The instrument can therefore be used as follows: the ball R and its clevis mounts 5 and 8 are positioned on the instrument in the same way as in the embodiment of FIG. 3, the clevis mount 8 being trapped between the forks 6 and 7. The knurled knob 3a is turned until there is contact between the end of the sleeve 26 and the nut 30 of the ball joint, and tightening is continued until the moment when the paint mark 28 begins to disappear under the sleeve. The ball R is then pressed against the end face of its socket with the force of 10 daN exerted on the clevis mount 5 by the spring 10. The operator then zeroes the comparator 9.

The knurled knob 4a is then turned until there is contact between the end of the sleeve 27 and the opposite nut 31 of the ball joint, and tightening is continued until the moment when the paint mark 29 begins to disappear under the sleeve. The spring 25 is then applying a force of 20 daN on the clevis mount 5, which force opposes the 10 daN force exerted on this clevis mount by the other spring 10. This means that the ball R is pressed into the opposite closed end of its socket with a differential force of 10 daN. The ball and clevis mount 5 assembly has therefore moved by the clearance to be measured, which then need merely be read off the comparator 9.

All the measurements can therefore be carried out under reproducible conditions, because the forces involved are always the same.

We claim:

1. Instrument for measuring a clearance, in a given direction, between two components, comprising two rigid yokes that can slide one inside the other in the said direction and each of which comprises on the one hand, a push member capable of exerting axial thrust, in a given sense, on one—termed the first—of the said components, at least one of these members exerting its thrust by means of a spring, and on the other hand a member for resting on the other component, capable of exerting an end-stop action on this other component in the opposite sense to the sense in which the said push member of the yoke in question exerts its force, the said push members of the two yokes being capable of exerting their forces coaxially but in two opposite senses, and in that at least one of the said push members is associated with measurement means for measuring, in the said given direction, the difference between the two axial positions of the said first component, namely the end-stop position it reaches when it is urged axially by the push member of one of the yokes and the end-stop position it reaches when it is urged axially in the other sense by the push member of the other yoke, while the said other component remains trapped between the respective resting members of the two yokes.

2. An instrument according to claim 1, wherein the push member, which has a spring, of one of said yokes is produced in the form of a threaded shank ending in an operating member by which it can be turned in a tapping of the yoke in question, this threaded shank having an axial bore passing through it in which there may slide, on the one hand, a smooth rod which externally ends in a stop that can rest on the first of the said components and, on the other hand, the plunger of a comparator, it being possible for the end of this plunger to come into contact with the interior end of said smooth rod, it being possible for a helical spring slipped over said smooth rod to be compressed between said stop and that end of said threaded shank that does not have said operating member.

3. An instrument according to claim 1 wherein said rigid yokes are generally U-shaped, the closed end of one being hollowed out so that the closed end of the other yoke can slide in it, and in that the push member associated with the yoke that has the hollowed-out closed end is produced in the form of a threaded shank ending in another operating member by which it can be turned in a tapping of the yoke in question, this threaded shank having an axial bore passing through it in which another smooth rod, immobilized axially in this bore and able to pivot therein, the said smooth rod ending, at the end that does not have the said other operating member, in another stop which can rest on the first of the said components.

4. An instrument according to claim 2, wherein said tappings for the threaded shanks are formed in the two outer branches of the said yokes, the inner branches of which end in the form of a fork leaving space for the first of the said components and capable of trapping the other component between them.

5. An instrument according to claim 1, wherein said other yoke has a branch that directly carries another stop that can rest on the first of the said components, a base for a member for resting on the other component, and a threaded shank engaged in a tapped hole in the said base for maneuvering the said branch, this threaded shank having another operating member on the same side as the operating member of the push member which has a spring.

6. An instrument according to claim 2, wherein said tappings for the threaded shanks are formed in nuts which can slide, transversely to the axis of these tappings, over respective cylindrical bearing surfaces formed on the internal faces of the branches of the corresponding yokes, the said branches having a slot through them for the said threaded shanks, these thus being able to pivot, while remaining aligned, in a determined angular range about a common center of curvature of the said cylindrical bearing surfaces.

7. An instrument according to claim 1, wherein said push members are each associated with means for controlling the force applied by them to the said first component.

8. An instrument according to claim 7, wherein said control means comprise a spring which can be compressed between the closed end of an end-stop sleeve and the end of the corresponding push member over which end the said sleeve is engaged, the said push member bearing a mark near the end of the sleeve so that as this end is reached, the compressive force of the corresponding spring will be known.

9. An instrument according to claim 2 wherein said rigid yokes are generally U-shaped, the closed end of one being hollowed out so that the closed end of the other yoke can slide in it, and in that the push member associated with the yoke that has the hollowed-out closed end is produced in the form of a threaded shank ending in another operating member by which it can be turned in a tapping of the yoke in question, this threaded shank having an axial bore passing through it in which another smooth rod, immobilized axially in this bore and able to pivot therein, the said smooth rod ending, at the end that does not have the said other operating member, in another stop which can rest on the first of the said components.

10. An instrument according to claim 3, wherein said tappings for the threaded shanks are formed in the two outer branches of the said yokes, the inner branches of which end in the form of a fork leaving space for the first of the said components and capable of trapping the other component between them.

11. An instrument according to claim 9, wherein said tappings for the threaded shanks are formed in the two outer branches of the said yokes, the inner branches of which end in the form of a fork leaving space for the first of the said components and capable of trapping the other component between them.

12. An instrument according to claim 2, wherein said other yoke has a branch that directly carries another stop that can rest on the first of the said components, a base for a member for resting on the other component, and a threaded shank engaged in a tapped hole in the said base for maneuvering the said branch, this threaded shank having another operating member on the same side as the operating member of the push member which has a spring.

13. An instrument according to claim 3, wherein said tappings for the threaded shanks are formed in nuts which can slide, transversely to the axis of these tappings, over respective cylindrical bearing surfaces formed on the internal faces of the branches of the corresponding yokes, the said branches having a slot through them for the said threaded shanks, these thus being able to pivot, while remaining aligned, in a determined angular range about a common center of curvature of the said cylindrical bearing surfaces.

14. An instrument according to claim 9, wherein said tappings for the threaded shanks are formed in nuts which can slide, transversely to the axis of these tappings, over respective cylindrical bearing surfaces formed on the internal faces of the branches of the corresponding yokes, the said branches having a slot through them for the said threaded shanks, these thus being able to pivot, while remaining aligned, in a determined angular range about a common center of curvature of the said cylindrical bearing surfaces.

15. An instrument according to claim 2, wherein said push members are each associated with means for controlling the force applied by them to the said first component.

16. An instrument according to claim 3, wherein said push members are each associated with means for controlling the force applied by them to the said first component.

17. An instrument according to claim 4, wherein said push members are each associated with means for controlling the force applied by them to the said first component.

18. An instrument according to claim 5, wherein said push members are each associated with means for controlling the force applied by them to the said first component.

19. An instrument according to claim 6, wherein said push members are each associated with means for controlling the force applied by them to the said first component.

20. An instrument according to claim 15, wherein said control means comprise a spring which can be compressed between the closed end of an end-stop sleeve and the end of the corresponding push member over which end the said sleeve is engaged, the said push member bearing a mark near the end of the sleeve so that as this end is reached, the compressive force of the corresponding spring will be known.

* * * * *